E. TIMMERHOFF.
GAS LIGHTING SYSTEM FOR AUTOMOBILES.
APPLICATION FILED FEB. 8, 1909.
924,513.
Patented June 8, 1909.
2 SHEETS—SHEET 1.
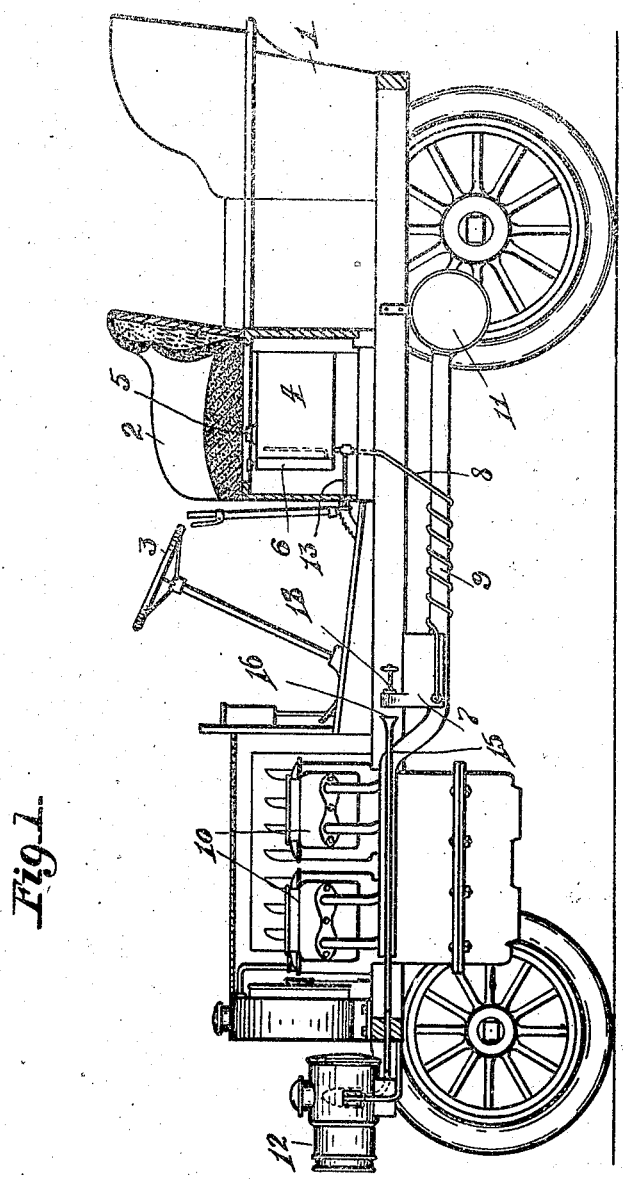

E. TIMMERHOFF.
GAS LIGHTING SYSTEM FOR AUTOMOBILES.
APPLICATION FILED FEB. 8, 1909.
924,513.
Patented June 8, 1909.
2 SHEETS—SHEET 2.
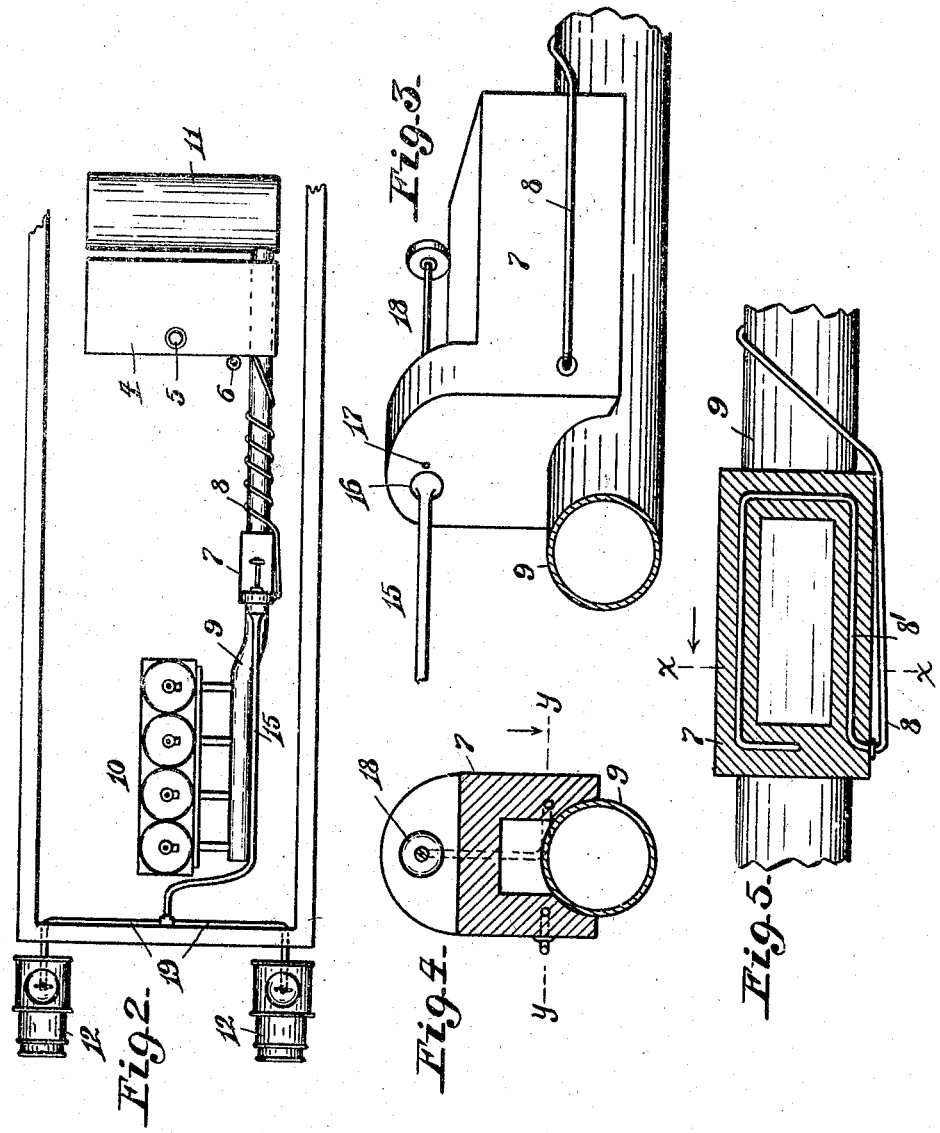
Witnesses:
George Ottsch
G. M. Cole
Ernest Timmerhoff
Inventor
By [signature]
Atty.

UNITED STATES PATENT OFFICE.

ERNEST TIMMERHOFF, OF WARSAW, INDIANA.

GAS-LIGHTING SYSTEM FOR AUTOMOBILES.

No. 924,513.   Specification of Letters Patent.   Patented June 8, 1909.

Application filed February 8, 1909. Serial No. 476,707.

*To all whom it may concern:*

Be it known that I, ERNEST TIMMERHOFF, citizen of the United States, residing at Warsaw, in the county of Kosciusko and State of Indiana, have invented certain new and useful Improvements in Gas-Lighting Systems for Automobiles, of which the following is a specification.

This invention relates to gas lighting systems for automobiles.

One object of the invention is to provide a generator embodying such characteristics that it may be readily mounted upon the exhaust pipe from the engine and contain heat for the generation of gas from the gasolene entering the same either at the time of operation of the engine or while the motor is at rest.

Another object of the invention resides in the provision of a generator so mounted and arranged for the generation of gas to keep the lamps lighted while the engine is at a standstill, the generator receiving its heat from the exhaust pipe by virtue of which the lamps are not only kept lighted but the gas is prevented from returning to a liquid.

With the above and other objects in view, the present invention consists in the combination and arrangements of parts hereinafter more fully described, illustrated in the accompanying drawings and particularly pointed out in the appended claims, it being understood that changes may be made in the form, proportion, size and minor details without departing from the spirit or sacrificing any of the advantages of the invention.

In the drawings:—Figure 1 is a side elevation of an automobile partly in section illustrating my invention. Fig. 2 is a top plan view of the engine, the gasolene tank, the generator, the lamps and the connections therebetween. Fig. 3 is an enlarged detail perspective view of the generator. Fig. 4 is a vertical transverse sectional view through the generator. Fig. 5 is a horizontal sectional view through the generator.

Referring now more particularly to the accompanying drawings, the reference character 1 indicates an automobile of any suitable type provided with the seat 2 and the steering wheel 3, there being a gasolene tank 4 disposed beneath the seat 2 to receive gasolene through the opening 5.

Coöperating with the gasolene tank 4 is an air pump 6 through the instrumentality of which the gasolene may be forced from the tank 4 to the generator 7 by way of the pipe 8 which is coiled around the exhaust pipe 9 to heat the gasolene in its passage from the tank to the generator. The generator 7 is also mounted upon the exhaust pipe 9 leading from the engine 10 so that it will become heated incident to the heated exhaust passing to the muffler 11. The walls of the generator are rather thick so that when they once become heated they will retain the heat a considerable length of time to insure generation of gas in the generator while the engine is at rest so that the lights may be kept burning in the lamps 12 while the engine is at a standstill. The pipe 8 communicates with the duct 8' formed in the walls of the generator 7, as shown in Fig. 5, and by virtue of the valve 13 disposed for manipulation at the bottom of the seat 2 the flow of gasolene from the tank 4 may be regulated.

The character 15 indicates a mixing tube provided with a flaring end 16 disposed adjacent to the needle valve 17 of the generator in spaced relation thereto so that when the needle valve operating element 18 permits of the passage of the gas from the generator into the mixing tube 15, air will also enter the tube and mix therein with the gas, which in its mixed state passes through the mixing tube 15 and into the branch pipe 19 through which latter the generated gas is conducted to the lamps, as shown particularly in Fig. 2.

When the needle valve operating element 18 is adjusted it does not need further attention, and as long as the generator is sufficiently heated, there will be a proper generation of gas, for supply to the lamps to keep the latter constantly burning whether the machine is in motion or at a standstill.

What is claimed is:—

1. In a motor vehicle, the combination with an engine, an exhaust pipe having communication with the engine, lamps, of a generator mounted upon the exhaust pipe, a gasolene tank, a valved connection between the tank and generator, said connection encircling the exhaust pipe, a mixing tube having communication with the lamps and receiving the gas from the generator and also receiving air for mixture with the gas in its passage through the mixing tube.

2. In a motor vehicle, the combination with an engine, an exhaust pipe having communication with the engine, lamps, of a generator mounted upon the exhaust pipe, a gasolene tank, a valved communication between the tank and the generator, and a mixing tube having communication with the lamps and arranged to receive the gas from the generator and conduct it to the lamps.

3. In a motor vehicle, the combination with an engine, an exhaust pipe having communication with the engine, lamps, of a generator mounted upon the exhaust pipe, a gasolene tank above the generator, means for conveying the gasolene from said tank to the generator, and means for conveying the generated gas from the generator to the lamps.

4. In a motor vehicle, the combination with an engine, an exhaust pipe having communication with the engine, lamps, of a generator mounted upon the exhaust pipe, a gasolene tank, a valved pipe between the tank and generator, the generator having a duct formed in the walls thereof and with which said valved pipe communicates, and means for conducting the generated gas from the generator to the lamps.

5. In a motor vehicle, an engine, an exhaust pipe communicating with the engine, lamps, of a generator straddling the exhaust pipe, a gasolene tank, a valved pipe encircling the exhaust pipe and communicating with the interior of the generator and the gasolene tank, and a mixing tube having communication with the lamps and also having a flaring inner end to receive the generated gas from the generator and conduct it to the lamps.

6. The combination with an engine, an exhaust pipe communicating with the engine, of a generator, a valved pipe encircling the exhaust pipe for communication with the generator, and a mixing tube having a flaring inner end to receive the generated gas from the generator and conduct it to a source of lighting.

In testimony whereof I affix my signature, in presence of two witnesses.

ERNEST TIMMERHOFF.

Witnesses:
GOLDIE P. SLOAT,
ALLAN S. WIDAMAN.